United States Patent

Schmidt

[15] 3,696,481
[45] Oct. 10, 1972

[54] APPARATUS FOR PERFORMING OPERATIONS ON HYDRAULIC TUBING

[72] Inventor: Paul Schmidt, Hauptstrasse 150, Saalhausen, Germany

[22] Filed: Nov. 16, 1970

[21] Appl. No.: 89,584

[30] Foreign Application Priority Data

Nov. 15, 1969 Germany..........P 19 57 566.7

[52] U.S. Cl.....................29/33 T, 29/200 B, 29/237, 29/520
[51] Int. Cl. ...........................................B23p 23/04
[58] Field of Search...29/33 T, 200 B, 282, 237, 520; 72/306

[56] References Cited

UNITED STATES PATENTS 3,183,702  5/1965  Zittell.........................29/33 T
3,156,284  11/1964  Stanley.......................29/282

Primary Examiner—Gil Weidenfeld
Attorney—Arthur O. Klein

[57] ABSTRACT

Apparatus for performing a number of operations on hydraulic tubing in the construction of hydraulic installations is mobile and includes a mechanical bending device, a mechanical cut-off device for cutting the tubing to length, a de-burring device for removing the burrs from the ends of the tubing after it has been cut and a device for securing coupling parts to the ends of the cut-off lengths of tubing. All of these devices are driven by hydraulic drives, consisting of rams or motors and all of the drives are supplied with hydraulic fluid under pressure from a common pump through a number of separate control valves.

21 Claims, 6 Drawing Figures

APPARATUS FOR PERFORMING OPERATIONS ON HYDRAULIC TUBING

When a hydraulic installation is being constructed it is extremely important, for safety in operation and to provide long working life, to ensure that the hydraulic tubes are correctly bent and installed in an unstressed condition, and also that the cut ends of the tubes are cleanly de-burred. Inaccurate assembly can cause operational difficulties and, in extreme cases, tube failure. The hydraulic devices in the installation are easily damaged by metal chips deriving from burrs formed on the tube ends when the tubes are cut off to length, usually by a saw.

To instal hydraulic tubes in a stress-free condition they have to be cut precisely to the correct lengths. In some cases the tubes are simply sawn off by hand, after which the cut ends are finished, that is to say are cleaned up, by hand, but this is a highly uneconomical method. Tube bending can also be done by hand, but to obtain an accurate tube bend, in which the tube is not flattened, involves special precautions, for example the tube can be filled with sand and the ends closed by welding before making the bend. Even so it is difficult to form a bend by hand which has the quality of a machine made bend. Finally the welded-up ends of the tube have to be cut off.

If the hydraulic fitter wishes to bend, cut off and de-burr the tubes by using machinery, he has to leave the site of the installation and transport the tubes to machines, which are usually at some distance from the site, if they are available in the locality at all. His only alternative is to bend, cut and finish the tubes by hand.

Even if machines are available the transportation of bent hydraulic tubing is often cumbersome and time consuming. The hydraulic tubes have to be dimensioned accurately on the site, that is to say they have to be accurately fitted. In some cases the hydraulic installation can be pre-assembled in the manufacturers works. However in some cases this cannot be done and it is necessary to transport machines, suitable for carrying out the necessary operations on hydraulic tubing, to the erection site. This is often just as inconvenient and time consuming as transporting the bent tubes to a location where machines are available for operating on them.

The object of the present invention is to provide a mobile unit which can easily be transported to an erection site and which is capable of performing, rapidly and accurately the operations of tube bending, cutting to length, de-burring and securing couplings to the tube ends.

To this end, according to this invention, apparatus for performing operations on hydraulic tubing is mobile and includes a mechanical bending device, a mechanical cut-off device, a de-burring device and a device for securing coupling parts to the ends of cut-off lengths of tubing.

The mobile unit is easy to propel by hand to the erection site and of wide applicability.

Each of the devices for bending, for cutting off and for de-burring the tubing preferably has its own hydraulic drive. The mobile apparatus preferably has a single source of hydraulic power for driving all the devices. In this respect the apparatus contrasts with conventional tube fitting machinery. A conventional bending machine is usually driven hydraulically, whereas cutting-off and de-burring machines are almost always driven electrically.

According to a further feature of the invention the several hydraulic devices of the mobile apparatus are all supplied with hydraulic fluid under pressure by a single, hydraulic pump. However this pump need not be capable of producing a high output, because the several devices, for bending, cutting-off and de-burring, are not operated simultaneously. The operator uses the devices one after the other, and consequently the hydraulic pump need develop a power output only sufficient for the device having the greatest consumption. A comparatively small hydraulic pump can therefore be used.

For cutting-off the lengths of hydraulic tubing the mobile apparatus may be provided with a circular saw which is driven by a hydraulic motor and is advanced towards the tubing by the piston rod of a hydraulic ram. The hydraulic motor is then connected hydraulically in series with the ram, so that the motor functions in effect as a pump for the ram, the two devices acting in synchronization with each other. For cutting thin walled tubing, which requires a low saw speed to obtain a clean cut, the speed of the hydraulic motor is preferably adjustable by means of a throttle, e.g., a constricted orifice, interposed at the inlet or outlet of the motor. This reduces the power output of the motor and reduces the linear velocity of the piston of the ram so that the circular saw advances only slowly towards and through the tubing.

The ram for advancing the circular saw may be single-acting and a return spring may return the saw as soon as the ram is hydraulically vented, after the completion of the cut.

For the cutting-off operation the hydraulic tubing is preferably clamped between two claim jaws, at least one of which is spring-loaded towards a closed position and is connected to a single-acting hydraulic ram by which it is retracted. This arrangement ensures that the tubing is held by spring pressure only, the retracting hydraulic ram being in operation only briefly, when the operator is inserting or removing the tubing.

For de-burring the tube ends, after cutting off, the mobile apparatus preferably has two milling cutters, one being a countersink cutter having external cutting teeth and the other being female and having internal cutting teeth. This allows the operator to de-burr the tube and internally by engaging it by hand with the external cutting teeth, and de-burr the tube end externally by engaging it with the internal cutting teeth.

For bending hydraulic tubing the mobile apparatus preferably has a rotatable mandrel with a grooved edge to mate with the periphery of the particular hydraulic tubing being bent. The radius of the mandrel corresponds to the desired radius of bend. The rotatable mandrel cooperates with a stationary thrust guide and a pivoted thrust guide which swings about the axis of the rotatable mandrel. Initially the two thrust guides are situated adjacent each other. The operator introduces the hydraulic tube between the rotatable mandrel and the two thrust guides. The tube is bent by swinging the pivoted thrust guide around the mandrel. Flattening of the tube is largely prevented by the fact that both the mandrel and the thrust guides have grooved edges, corresponding in section to the cross section of the tube. Flattening of the tube during bending is further prevented by providing the bending device with an auxiliary, internal mandrel, which is inserted into the tube before bending. The auxiliary mandrel can if desired be inserted into the end of the tube which moves as the tube is bent so that the auxiliary mandrel acts as a calibrating mandrel.

During the bending operation the auxiliary, internal mandrel becomes jammed inside the tube. A hydraulic retraction device is preferably therefore provided, for extracting the auxiliary mandrel from the tube. The retraction device is preferably in the form of a single-acting hydraulic ram, the return movement being effected by a return spring.

The mobile apparatus is provided with a device for securing a coupling part such as a union nut and olive to each tube end. The purpose of this is to facilitate the subsequent making of the tube joints during construction of the hydraulic installation.

The device of securing a union nut and olive to the tube end is preferably arranged as follows: A holder in the form of a die plate is provided for holding the end of the tube; the operator mounts a union nut and an olive on the end of the tube, and introduces the tube end into the holder. The device has a press tool in the form of a hollow ended plunger which applies a squeezing thrust to the olive so that the olive cuts into the outer periphery of the tube, forming a groove, the applied thrust at the same time forming a bulge in the wall of the tube. The hollow ended plunger is mounted on the end of the piston rod of a hydraulic ram. The press tools are interchangeable, the operator selecting a tool to suit the diameter of the tube being operated upon. The holder, for holding the hydraulic tube, in the form of an insert support and is also exchangeable, so that the operator can select an insert also to suit the diameter of the tubing.

The squeezing of the olive into the wall of the tubing must be done with precision, so as not to damage the tubing and so that the bulge formed does not interfere when the hydraulic joint is subsequently made. The hydraulic thrust applied to the press tool must therefore be adjustable with precision. For this purpose the hydraulic ram is preferably provided with an adjustable pressure relief valve, allowing the operator to adjust the highest hydraulic pressure reached in the ram, to suit the particular hydraulic tubing.

The adjustable pressure relief valve is preferably arranged as follows: The pressure relief valve has a closure member which is loaded towards the closed position by a spring, the spring pressure of which is adjustable by changing the position of a push rod which is mounted so that it can slide in and out of a housing of the valve. The push rod loads the spring. The position of the push rod is determined by the width of the insert which holds the hydraulic tube, the end of the push rod resting against the edge of the insert. This arrangement automatically adjusts the ram pressure to suit the particular tube diameter, by adjusting the response pressure of the pressure relief valve, in that when the operator instals the appropriate tube holder insert, to suit the particular hydraulic tubing diameter, this automatically adjusts the highest hydraulic pressure which will be developed in the cylinder during the squeezing of the olive.

An example of an apparatus constructed in accordance with the invention is illustrated in the accompanying drawings, in which.

Figure 1:
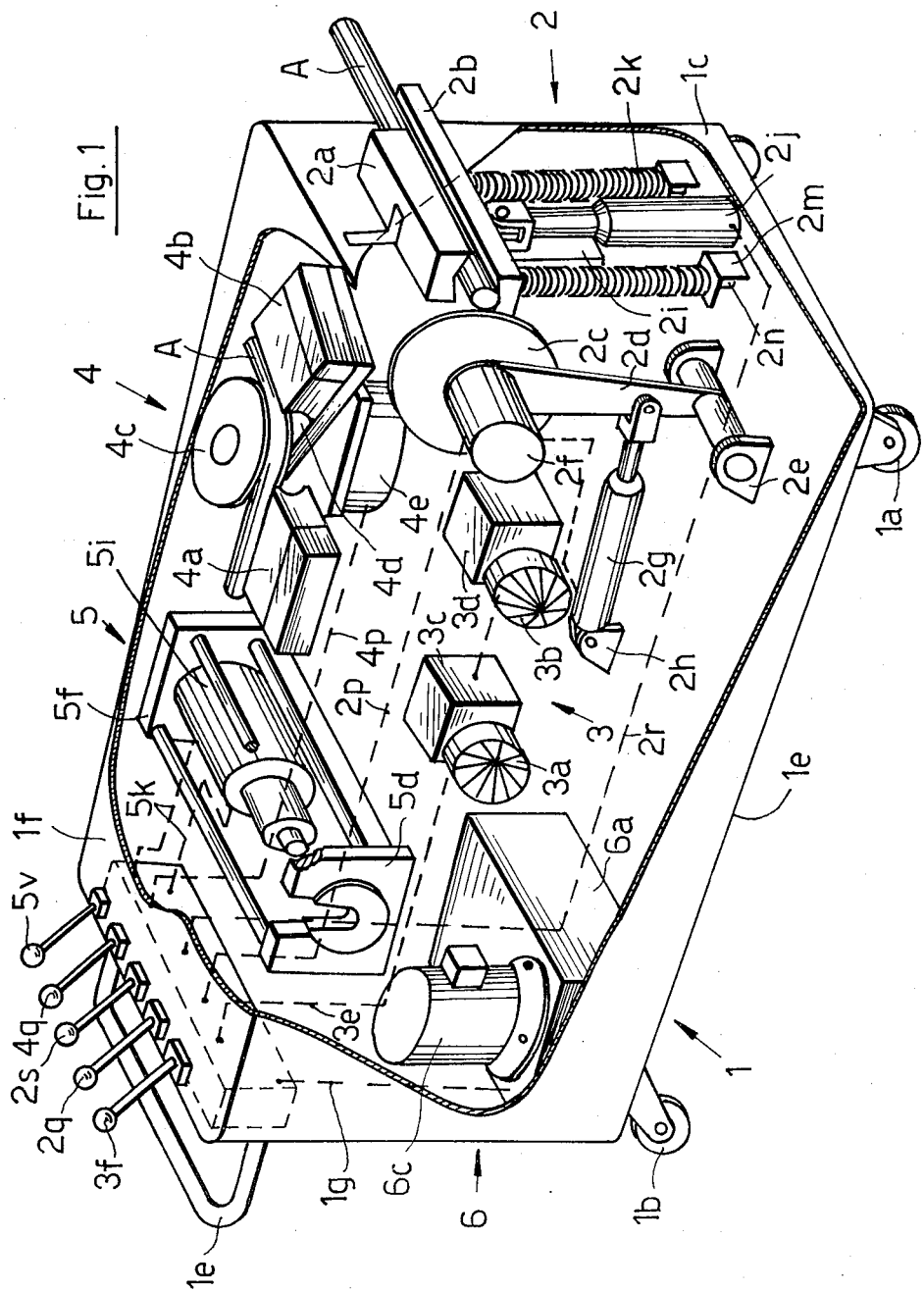
FIG. 1 is a somewhat diagrammatic perspective view of the apparatus.
Figure 2:
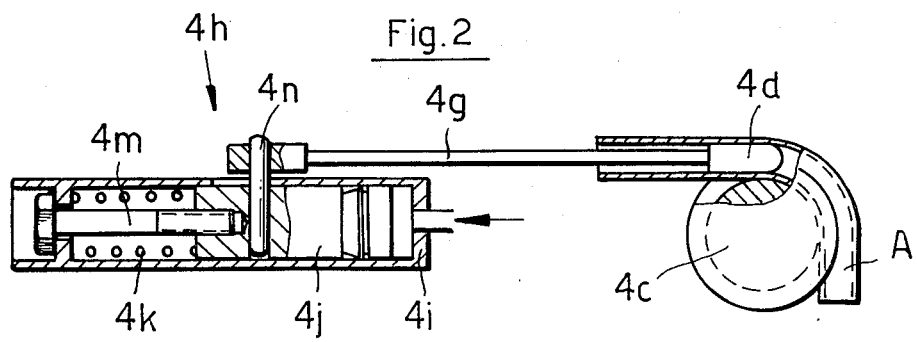
FIG. 2 shows a plan view of the tube bending device forming part of the apparatus.
Figure 3:
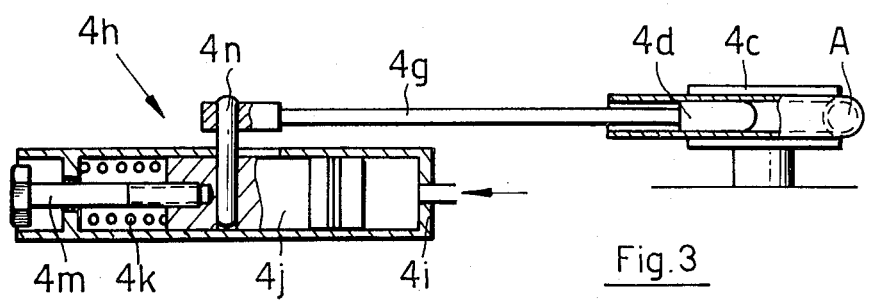
FIG. 3 is a side view of the tube bending device shown in FIG. 2.

As shown in FIG. 1, the apparatus is mobile and is in the form of a box shaped unit 1 mounted on wheels $1a$ and $1b$, The wheels $1b$ have a castor action, so that the mobile unit 1 can easily be moved by hand, by means of a rigid handle $1e$, and be steered to the site of operations.

The mobile unit 1 includes a cut-off device 2 for cutting hydraulic tubing A into lengths, a de-burring device 3 for removing the burrs from the cut ends of the lengths of hydraulic tubing, a bending device 4 for bending the tubing and a device 5 for mounting coupling parts in the form of an olive and a union nut on the cut and de-burred end of the hydraulic tubing A. The mobile unit 1 also contains drawers (not shown) for containing tools and electrical power cables.

The cut-off device 2 consists essentially of V-section clamp jaws $2a$ and $2b$ between which the hydraulic tubing A is clamped for cutting to length by a circular saw $2c$. The saw $2c$ is mounted on the end of an arm $2d$ which is pivoted in bearings $2e$ fixed to the frame of the apparatus. The saw is driven by a hydraulic motor $2f$. The swinging of the arm $2d$ is brought about by a single-acting hydraulic ram $2g$, which is pivoted in the bearing $2h$ fixed to the frame of the apparatus.

The V-section clamp jaw $2a$ is fixed to the outer face of the end wall $1c$ of the mobile unit 1. The other clamp jaw $2b$ slides up and down along a guide rail $2i$, being movable by a single-acting hydraulic ram $2j$, and two compression springs $2k$ which are supported on brackets $2m$ fixed to the outer face of the end wall $1c$. The springs $2k$ are guided by guide rods $2n$. The springs $2k$ act to close the jaws and the ram $2j$ to open them against the springs.

The device 3 for de-burring the cut ends of the hydraulic tubing A comprises two milling cutters $3a$ and $3b$ which rotate in bearings fixed to a side wall $1g$ of the mobile unit 1. The milling cutters $3a$, $3b$ may project outwards from the side wall $1g$, but preferably they are recesses in this wall, to reduce risk of injury to the operator. A recessed installation prevents any contact between the milling cutters and the operator, unless the operator deliberately inserts a hand into the recess. The milling cutter $3b$ has a male conical shape, that is to say it has the shape of a countersink cutter, and is used for de-burring the inner edge of the cut end of the hydraulic tubing A. On the other hand the milling cutter $3a$ has a female cone and is used for removing the burr from the outer edge of the cut end of the tube. The two milling cutters $3a$ and $3b$ are driven directly to rotate in the same direction by hydraulic motors $3c$ and $3d$.

The tube bending device 4 consists essentially of a tube bending mandrel 4c, which may be fixed but is preferably rotatable. The tube bending mandrel 4c cooperates with a further mandrel 4d which is connected through a mandrel rod 4g to a hydraulic drive assembly 4h.

The assembly 4h consists of a hydraulic cylinder 4i containing a piston 4j loaded by a compression spring 4k. The movement of the piston 4j, towards the tube bending mandrel 4c, is limited by an adjustable end stop in the form of a screw 4m. The mandrel rod 4g is connected to the piston 4j by a pin 4n which moves in a longitudinal slot in the wall of the cylinder 4i.

The tubing A is wrapped around the mandrel 4c by two thrust guides 4a and 4b. The thrust guide 4a is fixed in position to the top wall 1f of the mobile unit 1. The other thrust guide 4b is mounted on a pivoted arm 4f which is rotated about its pivot by a single-acting or double-acting hydraulic ram, or by a high torque hydraulic motor 4e. The tube bending mandrel 4c and the two thrust guides 4a, 4b have grooved edges to match the cross section of the tube A, to prevent flattening of the tube during bending.

If necessary the mandrel 4c can have a working surface of a material which has a high coefficient of friction, whereas the thrust guides 4a, 4b have working surfaces which present a low coefficient of friction in contact with the tube A. Consequently when the tube is being bent the outer surface of the tube is not damaged by abrasion where the thrust guides 4a, 4b slide along the surface of the tube.

The device 5 is for mounting an olive and union nut on the cut end of the hydraulic tubing A, as a preparation for the subsequent making of the hydraulic joint.

Figure 4:
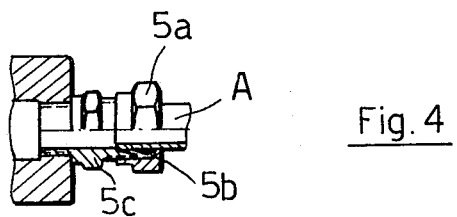
FIG. 4 shows a hydraulic coupling with an olive and a union nut.

FIG. 4 shows the construction of the subsequently made hydraulic joint which is of the usual cone and olive type. An externally threaded, double-ended connection piece 5c is screwed into a bore in the wall of a hydraulic device, for example a valve, or a pump, or a hydraulic accumulator. The projecting end of the connection piece 5c has an internally conical bore. On to the projecting end of the connection piece 5c a union nut 5a containing an olive 5b is screwed. In this operation the union nut squeezes the olive, which cuts into the end of the hydraulic tubing A, making a tight joint.

Figure 5:
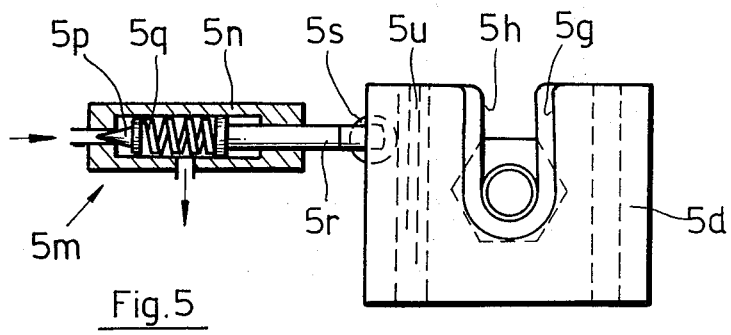
FIG. 5 shows a detail of a part of the apparatus for securing the coupling parts shown in FIG. 4 on the end of the tubing; and, FIG. 6 shows further details of the part of the apparatus shown in FIG. 5.
Figure 6:
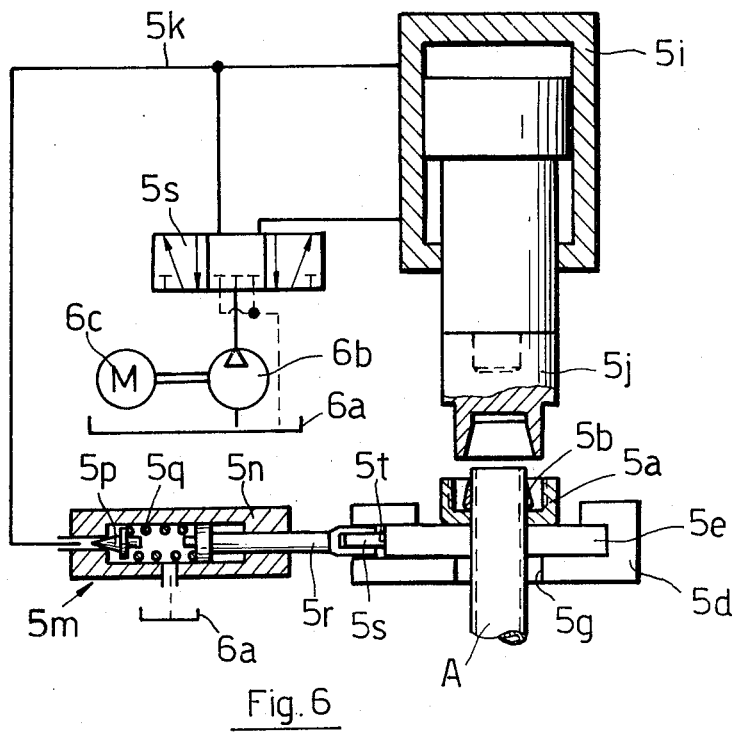

For mounting the union nut 5a an olive 5b on the cut end of the tubing A, the device 5 operates as follows: A frame 5f fixed to the upper wall 1f of the mobile unit 1 supports a holder or die plate 5d, which contains an insert support 5e, as shown in FIGS. 1, 5 and 6. The insert support 5e is exchangeable, that is to say a number of insert supports 5e are provided, each to suit hydraulic tubing of a particular external diameter. The die plate or holder 5d is dimensioned to take any of the insert supports 5e. The operator selects the appropriate support 5e, to suit the particular cut piece of tubing, and inserts it into the holder 5d. The holder 5d has a slot 5g of a width sufficient to accommodate hydraulic tubing A of the greatest expected diameter. On the other hand the selected insert support 5e has a slot 5h the width of which matches the external diameter of the particular piece of hydraulic tubing A which is being operated on. That is to say the slot 5h is wide enough to allow easy introduction of the particular piece of hydraulic tubing A.

To operate the device 5, the operator first of all mounts a union nut 5a and an olive 5b on to the cut end of the hydraulic tubing A. He then introduces the tubing A into the slot 5h so that the union nut 5a rests against the surface of the insert support 5e, as shown in FIG. 6. The cut end of the tubing A projects a little beyond the union nut. The operator then actuates a double-acting hydraulic ram 5i, on the projecting end of the piston rod of which a hollow ended plunger 5j is mounted. The hydraulic pressure in the ram 5i thrusts the plunger 5j so that its hollow nose enters the union nut 5a, squeezing the olive 5b so that it cuts into the wall of the hydraulic tubing, so that when the hydraulic joint is subsequently made the olive 5b cannot slip on the end of the tubing. The hollow end of the plunger 5j is made internally conical for this purpose. Its outer diameter is somewhat less than the internal diameter of the threaded part of the union nut 5a. The hollow ended plunger 5j is exchangeable, so that the operator can select the appropriate plunger for the particular diameter of hydraulic tubing.

In this operation it is important to ensure that the hydraulic pressure in the ram 5i is exactly right, so that exactly the correct amount of forcing-in of the olive and bulging out of the tube wall is obtained. Adjustment of the hydraulic pressure in the ram 5i is provided as follows: The cylinder 5i is connected to the inlet of a pressure relief valve 5m, which has a housing 5n containing a valve closure member 5p loaded by an adjustable compression spring 5q. The pressure relief valve 5m has an outlet connected to an oil reservoir 6a. When the parts are in the positions shown in FIGS. 5 and 6, the valve closure member 5p blocks the inlet of the valve. The compression spring 5q is adjustable by means of a push rod 5r which slides through a bore in the housing 5n. When the device is in operation the thrust of the compression spring 5q is adjusted, to suit the particular hydraulic tubing A, by the position of the push rod 5r.

The position of the push rod 5r is determined as follows: On the end of the push rod remote from the housing 5n there is a roller 5s which engages one edge 5t of the insert support 5e. The different insert supports 5e are of different widths, and consequently when the insert support 5e is exchanged for a different one, the piston push rod 5r assumes a different position. Adjustment of the spring load on the valve closure member 5p, and consequently adjustment of the hydraulic pressure in the cylinder 5i, is therefore obtained automatically when a different insert support 5e is selected by the operator. The widths of the insert supports 5e are made so that the thrust applied by the hollow ended plunger 5j is always exactly suited to the particular hydraulic tube which fits the slot of the insert support.

The oil reservoir 6a supplies oil to a hydraulic pump assembly 6 which supplies all the hydraulic rams 2g, 2j and 5i as well as the hydraulic motors 3a, 3b and 4e. The pump assembly 6 consists of a hydraulic pump 6b, which draws oil from the reservoir 6a and delivers it to the various rams and motors, and an electric motor 6c, which drives the pump. The oil supplied under pressure to each ram or motor is controlled by a manually operated control valve. All the control valves are connected in parallel, giving each of the devices operated in effect its own independent hydraulic circuit. The ram 2g and the motor 2f are served by a hydraulic circuit 2p controlled by a control valve 2q. The ram 2j is served by a hydraulic circuit 2r, controlled by a control valve 2s. The motors 3a and 3b are served by a hydraulic circuit 3e, controlled by a control valve 3f. The oil motor 4c and the ram 4h are served by a hydraulic circuit 4p, controlled by a control valve 4q. The ram 5i is served by a hydraulic circuit 5k controlled by a control valve 5v.

When the mobile unit is put into operation, it is wheeled to the location where it is required. The operator first of all bends the hydraulic tubing A using the bending device 4, and then cuts it off to length using the cut-off device 2. After de-burring the cut ends using the de-burring device 3, the union nut and olive are mounted on the pipe ends by means of the device 5.

The bending process is conducted as follows: The tubing A is inserted between the thrust guides 4a, 4b, which are initially situated adjacent each other, and the bending mandrel 4c, the tube being pushed over the smaller mandrel 4d. The operator actuates the control valve 4q, starting the high torque motor 4e, which swings the pivoted arm 4d about the axis of the bending mandrel 4c so that the thrust guide 4b wraps the tubing A around the mandrel 4c. This movement is continued until the tube has been bent through an angle somewhat greater than the desired final bend angle, so that when the tubing is released it returns elastically to form the desired bend angle. The mandrel 4d acts as a calibrating mandrel, and in particular prevents the tube from flattening when a bend of small radius is formed. The calibrating mandrel 4d becomes jammed in the tube during the bending. It is extracted by the ram 4h. If desired the ram 4h can be mounted on the pivoted arm 4d, the calibrating mandrel 4d then being inserted into the moving end of the tube. In this case the calibrating mandrel 4d is extracted from the tube progressively during the bending, calibrating the tube progressively without any risk of an excessive bending stress being applied to the mandrel rod 4g. For this purpose, the ram 4h is connected into the hydraulic circuit 4b in series with the motor 4e. The motor 4e produces a very high torque, either directly or through a speed reduction gear. With the motor 4e hydraulically in series with the cylinder assembly 4h, the motor 4e governs the movement of the calibrating mandrel 4d so that the mandrel 4d is extracted from the tube in synchronization with the rotation of the high torque motor 4e.

However in the present example the calibrating mandrel 4d is in the stationary end of the hydraulic tubing A. In this case the calibrating mandrel 4d remains in its initial position, limited by the adjustment screw 4m, until after the bending of the tube has been completed. As soon as the bending has been completed the operator actuates the control valve 4q, which can for example be a multi-path valve, with the result that the motor 4e, which can for example be reversible, swings the pivoted arm 4d back to its initial position. At the end of this movement the pivoted arm 4d is stopped by the thrust guide 4a, and the motor 4e is prevented from rotating further. Hydraulic presure builds up in the motor 4e, opening a pressure relief valve (not shown) releasing a stream of oil which passes through the pressure relief valve and actuates the ram 4h, which automatically extracts the calibrating mandrel 4d from the hydraulic tubing A. The hydraulic pressure is then removed from the ram, for example by further actuation of the control valve 4q, and the hydraulic circuit 4p which serves the device 4 is closed.

After the bending, the hydraulic tubing A is cut off to length using the cut-off device 2, unless this has already been done. For this purpose the operator actuates the control valve 2s, applying hydraulic pressure to the ram 2j and lowering the V-section clamp jaw 2b against the action of the springs 2k so that the hydraulic tubing A can be introduced between the two clamp jaws 2a and 2b, up against an end stop (not shown). Further actuation of the control valve 2s releases the pressure in the ram 2j, allowing the springs 2k to lift the lower clamp jaw 2b, so that the hydraulic tubing A is gripped, ready for cutting to length.

With the hydraulic tubing A firmly clamped in place, the operator actuates the control valve 2q, energizing the motor 2f. Rotation of the motor 2f delivers oil under pressure to the hydraulic ram 2g, which is connected hydraulically in series with the motor 2f. The ram 2g, swings the arm 2d and advances the rotating saw 2c against and through the tubing A, cutting it off to length. The movement of the pivoted arm 2d, or of the circular saw 2c, actuates a switch (not shown) which starts a supply of coolant for the saw blade. The coolant is supplied by a coolant pump from a coolant storage tank, which contains a filter for filtering the coolant. The coolant is delivered through a nozzle accurately to the cut. As soon as the cut has been completed, the pivoted arm 2d is returned to its initial position, by a return spring, tripping a switch which automatically stops the flow of coolant. After retracting the ram 2j the operator can remove the hydraulic tubing A from between the two clamp jaws 2a and 2b.

It should be observed that risk of injury to the operator from the circular saw is minimized, in that the saw blade 2c is initially retracted behind the front wall 1c of the mobile unit 1. The saw blade advances through a narrow slot in the front wall 1c, to cut the tubing A. The front wall 1c has a bulge which acts as a guard during the cutting operation, and a recess which accommodates the tubing A in such a way that the saw blade 2c never projects outwards beyond the plane of the wall 1c.

When cutting thin walled hydraulic tubing, a clean cut can only be obtained if the saw blade 2c is rotated comparatively slowly. The motor 2f is therefore provided with a throttle or restricted orifice, as a simple method of reducing the saw blade speed.

After the cutting operation the cut ends of the hydraulic tubing A have to be de-burred. The operator actuates the control valve 3f, energizing the motors 3c and 3d, and then applies the cut ends of the tube by hand first to the milling cutter 3b, to remove the inner burr, and then to the female cutter 3a to remove the outer burr, or vice-versa.

After de-burring the cut ends of the tubing, the operator uses the device 5 for mounting a union nut and an olive on the end of the tubing. For this purpose the operator selects the appropriate insert support 5e, suitable for the particular tube diameter, and inserts it in the holder 5d. He also mounts the appropriate hollow ended plunger 5j on the end of the piston rod of the ram 5i. After mounting a union nut 5a and an olive 5b on each end of the hydraulic tube A, the operator introduces each end of the tube in turn into the support 5e and energizes the ram 5i by actuating the control valve 5s.

I claim:

1. Apparatus for performing operations on hydraulic tubing, said apparatus including a frame, means for mobilizing said frame, said frame having mounted thereon tube bending means, tube cut-off means for cutting off lengths of said tubing, means for de-burring the ends of said cut-off lengths of tubing, and means for securing coupling parts to said ends, mechanical drive means mounted on said frame and means operatively connecting said mechanical drive means to said bending means, said cut-off means, said de-burring means and said means for securing coupling parts.

2. Apparatus as claimed in claim 1, wherein said mechanical drive means includes a plurality of separate hydraulic drive means and means operatively connecting said hydraulic drive means to said bending means, said cut-off means and said de-burring means.

3. Apparatus as claimed in claim 2, wherein said mechanical drive means further includes a single hydraulic pump and means operatively connecting said pump to each of said plurality of hydraulic drive means.

4. Apparatus as claimed in claim 1, wherein said bending means includes a tube bending mandrel, means defining a peripheral groove in said mandrel, means rotatably mounting said mandrel, a first thrust guide, means stationarily mounting said first thrust guide, a second thrust guide, means pivotally mounting said second thrust guide and means for swinging said second thrust guide about the axis of said rotatable mandrel.

5. Apparatus as claimed in claim 4, wherein said bending means further includes a calibrating mandrel and means mounting said calibrating mandrel for insertion in said tubing when said tubing is held between said bending mandrel and said thrust guides.

6. Apparatus as claimed in claim 5, further comprising means for retracting said calibrating mandrel to withdraw said mandrel from said tubing.

7. Apparatus as claimed in claim 6, where said retracting means includes hydraulic ram means and means operatively connecting said ram means to said calibrating mandrel.

8. Apparatus as claimed in claim 7, wherein said hydraulic ram means is single-acting and includes a cylinder, a piston and compression spring means within said cylinder acting on said piston to move said piston in a direction opposite to that in which said ram is single-acting.

9. Apparatus as claimed in claim 1, wherein said cut-off means includes circular saw means, first mounting means for mounting said circular saw means for rotation about an axis, second mounting means mounting said first mounting means for advancing and retracting movement lateral to said axis to advance said saw to cut said tubing, a hydraulic motor, means operatively connecting said hydraulic motor to said saw to rotate said saw, a hydraulic ram, means operatively connecting said hydraulic ram to said second mounting means, means hydraulically connecting said hydraulic motor in series with said ram and hydraulic pump means for supplying hydraulic fluid to said motor and thence to said ram.

10. Apparatus as claimed in claim 9, wherein said hydraulic motor includes throttling means to limit the speed of rotation thereof.

11. Apparatus as claimed in claim 9, wherein said hydraulic ram is single-acting and includes return spring means.

12. Apparatus as claimed in claim 9, further comprising clamping means for holding said tubing while said tubing is cut by said saw, said clamping means including first and second clamp jaws, means fixedly mounting said first jaw, means movably mounting said second jaw for movement towards and away from said first jaw, spring means for moving said second jaw towards said first jaw and hydraulic ram means for moving said second jaw away from said first jaw against the action of said spring means.

13. Apparatus as claimed in claim 1, wherein said de-burring means includes a countersink milling cutter for de-burring said cut-off tube end internally, a female conical milling cutter for de-burring said cut-off tube end externally and means for rotating said milling cutters.

14. Apparatus as claimed in claim 13, wherein said means for rotating said milling cutters includes a first hydraulic motor, a second hydraulic motor, means operatively connecting said first hydraulic motor to said countersink milling cutter, means operatively connecting said second hydraulic motor to said female conical milling cutter, means hydraulically connecting said first and second hydraulic motors in series with each other and means for supplying hydraulic fluid under pressure to one of said motors.

15. Apparatus as claimed in claim 1, wherein said means for securing coupling parts to said tubing includes a press tool and a die plate for securing an olive to said tubing.

16. Apparatus as claimed in claim 15, wherein said press tool includes a hydraulic ram, a piston rod extending from said ram, a press tool bit, and means detatchably mounting said press tool bit on said piston rod whereby said press tool bit is exchangeable.

17. Apparatus as claimed in claim 16, wherein said die plate includes an insert support and means detatchably mounting said insert support on said die plate whereby said insert support is exchangeable.

18. Apparatus as claimed in claim 17, wherein said hydraulic ram having said piston on which said pressure tool is mounted includes adjustable pressure relief valve means.

19. Apparatus as claimed in claim 18, wherein said adjustable pressure relief valve means includes a valve seat, a valve closure member, spring means biasing said closure member towards said seat and means for adjusting the force exerted by said spring means, said adjusting means including a push rod, means mounting said push rod in engagement with said spring means and for sliding movement in and out of said valve and means engaging said push rod with said insert support whereby the position of said push rod is dependent upon the width of said insert support and the position of said push rod adjusts the force exerted by said spring means.

20. Apparatus as claimed in claim 19, further comprising a roller and means rotatably mounting said roller on one end of said push rod, said roller engaging said insert support.

21. Apparatus as claimed in claim 20, wherein said insert support includes means defining a sloping edge, said sloping edge being contacted by said roller.

* * * * *